US012361174B2

(12) United States Patent
Ezrielev et al.

(10) Patent No.: US 12,361,174 B2
(45) Date of Patent: Jul. 15, 2025

(54) DETECTING POSSIBLE ATTACKS ON ARTIFICIAL INTELLIGENCE MODELS USING STRENGTHS OF CAUSAL RELATIONSHIPS IN TRAINING DATA

(71) Applicant: Dell Products L.P., Round Rock, TX (US)

(72) Inventors: Ofir Ezrielev, Beer Sheva (IL); Tomer Kushnir, Omer (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 215 days.

(21) Appl. No.: 18/459,122

(22) Filed: Aug. 31, 2023

(65) Prior Publication Data
US 2025/0077713 A1    Mar. 6, 2025

(51) Int. Cl.
*G06F 21/64* (2013.01)
*G06F 21/55* (2013.01)
(Continued)

(52) U.S. Cl.
CPC .............. *G06F 21/64* (2013.01); *G06F 21/55* (2013.01); *G06F 21/56* (2013.01); *G06N 20/20* (2019.01);
(Continued)

(58) Field of Classification Search
None
See application file for complete search history.

(56) References Cited

U.S. PATENT DOCUMENTS 6,922,816 B1    7/2005 Amin et al.
10,936,173 B2   3/2021 Ubillos et al.
(Continued)

FOREIGN PATENT DOCUMENTS

EP      4481632 A1 *  12/2024 ............. G06N 20/00
KR   20250011365 A *   1/2025
(Continued)

OTHER PUBLICATIONS

Anastasovski, Goce, "Classification of Malicious Web Traffic" (2013). Graduate Theses, Dissertations, and Problem Reports. 153. (118 Pages).
(Continued)

*Primary Examiner* — Ali H. Cheema
(74) *Attorney, Agent, or Firm* — WOMBLE BOND DICKINSON (US) LLP

(57) ABSTRACT

Methods and systems for managing artificial intelligence (AI) models are disclosed. To manage AI models, an instance of an AI model may not be re-trained using training data determined to be potentially poisoned. By doing so, malicious attacks intending to influence the AI model using poisoned training data may be prevented. To do so, a first level of strength of a first causal relationship present in historical training data may be compared to a second level of strength of a second causal relationship present in a candidate training data set. The first level of strength and the second level of strength may be expected to be similar within a threshold. If a difference between the first level of strength and the second level of strength is not within the threshold, the candidate training data may be treated as including poisoned training data.

20 Claims, 7 Drawing Sheets

(51) Int. Cl.
*G06F 21/56* (2013.01)
*G06N 20/20* (2019.01)
*H04L 9/40* (2022.01)

(52) U.S. Cl.
CPC ...... *H04L 63/1408* (2013.01); *H04L 63/1425* (2013.01)

(56) References Cited

U.S. PATENT DOCUMENTS

| | | | |
|---|---|---|---|
| D917,546 S | | 4/2021 | Mayler et al. |
| 11,030,709 B2 | | 6/2021 | McLinden et al. |
| 11,449,942 B2 | | 9/2022 | Basu et al. |
| 11,460,997 B2 | | 10/2022 | Homma et al. |
| 11,783,025 B2 | * | 10/2023 | Molloy .................. G06V 10/82 706/12 |
| 2018/0293516 A1 | * | 10/2018 | Lavid Ben Lulu ...... G07C 3/00 |
| 2021/0209512 A1 | | 7/2021 | Gaddam |
| 2022/0027792 A1 | * | 1/2022 | Cummings ............ G06N 20/00 |
| 2022/0078637 A1 | * | 3/2022 | Tullberg ................. H04L 67/34 |
| 2022/0300857 A1 | * | 9/2022 | Lavid Ben Lulu .. G05B 13/027 |
| 2023/0030136 A1 | * | 2/2023 | Lancioni .................. G06N 7/01 |
| 2023/0032822 A1 | * | 2/2023 | Wang ...................... G06N 20/20 |
| 2023/0198855 A1 | * | 6/2023 | Ganesan ................. H04L 41/16 706/10 |
| 2023/0368074 A1 | * | 11/2023 | Mallya ................... G06N 20/00 |
| 2024/0134972 A1 | * | 4/2024 | Boue ...................... G06F 16/906 |
| 2024/0185090 A1 | | 6/2024 | Rafferty |
| 2024/0195826 A1 | | 6/2024 | Mathews et al. |
| 2024/0250975 A1 | * | 7/2024 | Pourahmadi ........ H04L 63/1425 |
| 2024/0273184 A1 | | 8/2024 | Yarabolu et al. |
| 2025/0013913 A1 | * | 1/2025 | Boué ...................... G06N 20/00 |

FOREIGN PATENT DOCUMENTS

| | | | | |
|---|---|---|---|---|
| WO | 2020/123985 A | | 6/2020 | |
| WO | WO-2021167733 A1 | * | 8/2021 | ............. G06N 20/00 |
| WO | WO-2022115623 A1 | * | 6/2022 | ............. G06F 9/451 |

OTHER PUBLICATIONS

Joshi, Naveen, "Is The Data Used for Training Your Machine Learning Model Safe?" Technology for You, Jul. 28, 2022, Web Page <https://www.technologyforyou.org/is-the-data-used-for-training-your-machine-learning-model-safe/> accessed on Sep. 1, 2022 (3 Pages).

Di, Jimmy Z., et al. "Hidden poison: Machine unlearning enables camouflaged poisoning attacks." NeurIPS ML Safety Workshop. 2022. (28 Pages).

Wang, Siruo, et al., "Methods for correcting inference based on outcomes predicted by machine learning." Proceedings of the National Academy of Sciences 117.48 (2020): 30266-30275. (10 Pages).

Rauschmayr, Nathalie, et al., "Detecting and analyzing incorrect model predictions with Amazon SageMaker Model Monitor and Debugger," Amazon Web Services, Jul. 9, 2020, Web Page <https://aws.amazon.com/blogs/machine-learning/detecting-and-analyzing-incorrect-model-predictions-with-amazon-sagemaker-model-monitor-and-debugger/> accessed on Sep. 1, 2022 (13 Pages).

Jackson Higgins, Kelly, "Honeypot Stings Attackers With Counterattacks," DarkReading, Mar. 26, 2013, Web Page <https://www.darkreading.com/vulnerabilities-threats/honeypot-stings-attackers-with-counterattacks> accessed on Sep. 1, 2022 (4 Pages).

Susmelj, Igor, "The Data You Don't Need: Removing Redundant Samples," Towards Data Science, Mar. 19, 2020, Web Page <https://towardsdatascience.com/the-data-you-don-t-need-removing-redundant-samples-6bfd07c1516c> accessed on Sep. 1, 2022 (10 Pages).

Aghakhani, Hojjat, et al. "Bullseye polytope: A scalable clean-label poisoning attack with improved transferability." 2021 IEEE European symposium on security and privacy (EuroS&P). IEEE, 2021. (20 Pages).

Zhibo Wang et al., "Threats to Training: A Survey of Poisoning Attacks and Defenses on Machine Learning Systems." ACM Computing Surveys, vol. 55, No. 7, Article 134. Dec. 2022: pp. 1-36. (Year: 2022).

* cited by examiner

US 12,361,174 B2

DETECTING POSSIBLE ATTACKS ON ARTIFICIAL INTELLIGENCE MODELS USING STRENGTHS OF CAUSAL RELATIONSHIPS IN TRAINING DATA

FIELD

Embodiments disclosed herein relate generally to artificial intelligence (AI) models. More particularly, embodiments disclosed herein relate to systems and methods to manage instances of AI models.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
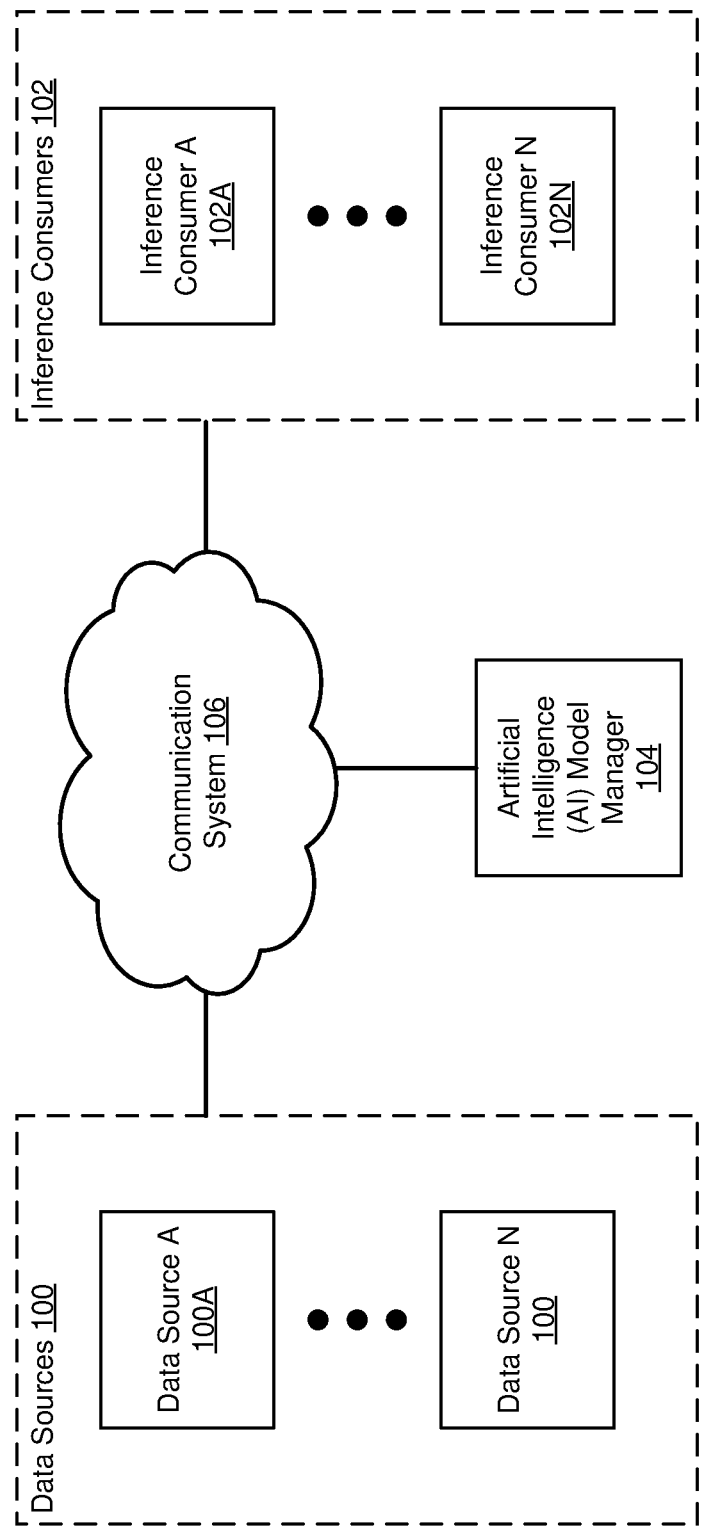
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing AI models. Trained AI models may provide computer-implemented services (e.g., inference generation) for downstream consumers (e.g., inference consumers). To manage trained AI models, a data processing system may, over time, update AI models through training using training data. However, if poisoned training data is introduced to the AI model, the AI model may become untrustworthy (e.g., the AI model may be tainted by the poisoned training data). Inferences generated using the tainted AI model may also be untrustworthy or inaccurate.

Once it has been discovered that an AI model has been tainted with poisoned training data, the model may require re-training to remove the influence of the poisoned training data, and any or all inferences generated using the tainted AI model may be untrustworthy. Training an AI model may be a computationally expensive process and may require the use of a limited amount of computing resources that may otherwise be used for inference generation. In other words, computing resources spent re-training AI models may interrupt inference consumption and/or other types of computer-implemented services that may otherwise be provided using the computing resources dedicated to re-training.

To reduce computing resources spent re-training AI models exposed to poisoned training data, training data sets may be analyzed prior to use for re-training an instance of an AI model. A malicious attacker may attempt to bias the AI model in pursuit of a goal. To do so, the malicious attacker may introduce poisoned data values into candidate training data sets. By doing so, relationships previously established for the AI model through unpoisoned training data may be disrupted and the AI model may no longer generate predictions in line with those relationships. To detect potentially poisoned training data, a candidate training data set (e.g., a data set intended to be used to update an instance of the AI model) may be analyzed prior to performing the update process.

To analyze the candidate training data set, the candidate training data set may be compared to a historical training data set (e.g., a data set including data values previously used to train instances of the AI model and/or otherwise a trusted data set). To do so, a first causal relationship (e.g., a relationship between a feature and a label for the feature, a relationship between a feature and a second feature) may be obtained from the historical training data set. A second causal relationship (e.g., a relationship between a second feature and a second label for the second feature) from the candidate training data set may be obtained and compared to the first causal relationship.

The first causal relationship and the second causal relationship may be similar causal relationships (e.g., the same type of mathematical function may fit both causal relationships). However, the first causal relationship may have a first level of strength and the second causal relationship may have a second level of strength. The first level of strength may indicate a goodness of fit for the mathematical function to a portion of the historical training data set that includes the first feature and the first label. Similarly, the second level of strength may indicate a goodness of fit for the mathematical function to a portion of the candidate training data set that includes the second feature and the second label.

A quantification of a difference between the first level of strength and the second level of strength may be obtained and compared to a threshold for the quantification. If the quantification is within the threshold, the candidate training data set may be approved for use in training future instances of AI models. If the quantification is not within the threshold, the candidate training data set may be treated as including poisoned training data.

By doing so, embodiments disclosed herein may provide a system for managing AI models in which the introduction of poisoned training data may be computationally efficiently mitigated. By not re-training the AI model when candidate training data is considered potentially poisoned, impacts of attacks intended to manipulate inference generation by the AI model may be reduced. Consequently, the computational resources typically associated with re-training a tainted AI model may be reduced, leaving more resources for inference generation.

In an embodiment, a method of managing an artificial intelligence (AI) model is provided. The method may include: obtaining a candidate training data set usable to update an instance of the AI model; identifying a historical training data set, the historical training data set being obtained prior to the candidate training data set and the historical training data set already having been used to train the instance of the AI model; obtaining a quantification of a difference between levels of strengths of similar causal relationships in the candidate training data set and the historical training data set; making a determination regarding whether the quantification is within a threshold for the quantification; and in a second instance of the determination in which the quantification is not within the threshold: treating the candidate training data set as comprising poisoned training data.

The method may also include: in a first instance of the determination in which the quantification is within the threshold: obtaining a second instance of the AI model using at least the candidate training data set.

Obtaining the quantification may include: identifying a first causal relationship of the similar causal relationships in the historical training data set; identifying a first level of strength of the first causal relationship; identifying a second causal relationship of the similar causal relationships in the candidate training data set; and identifying a second level of strength of the second causal relationship.

The first causal relationship and the second causal relationship may relate same features and same labels.

The first causal relationship may be based on a first feature present in the historical training data set and a first label present in the historical training data set.

The second causal relationship may be based on a second feature present in the historical training data set and a second label present in the historical training data set.

The first feature may be based on first measurements of a quantity during a first period of time and the second feature may be based on second measurements of the quantity during a second period of time, the first period of time being prior to the second period of time.

The first label may be based on third measurements of a second quantity during the first period of time and the second label may be based on fourth measurements of the second quantity during the second period of time.

A level of strength of the level of strengths may be based on a goodness of fit of a function to a portion of the historical training data set, the function defining a causal relationship of the similar causal relationships.

The quantification of the difference may be based on the goodness of the fit and a second goodness of a second fit of a second function to a second portion of the candidate training data set.

The threshold may be based on a level of tolerance for use of poisoned training data in the AI model.

A non-transitory media may include instructions that when executed by a processor cause the computer-implemented method to be performed.

A data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services that may utilize AI models as part of the provided computer-implemented services.

The AI models may include, for example, linear regression models, deep neural network models, and/or other types of AI models. The AI models may be used for various purposes. For example, the AI models may be trained to recognize patterns, automate tasks, and/or make decisions.

The computer-implemented services may include any type and quantity of computer-implemented services. The computer-implemented services may be provided by, for example, data sources 100, AI model manager 104, inference consumers 102, and/or any other type of devices (not shown in FIG. 1). Any of the computer-implemented services may be performed, at least in part, using AI models and/or inferences obtained with the AI models.

Data sources 100 may obtain (i) training data usable to train AI models, and/or (ii) ingest data that is ingestible into trained AI models to obtain corresponding inferences.

To obtain AI models, AI model manager 104 may (i) initiate the training of an instance of an AI model using the training data, and/or (ii) obtain inferences using a trained AI model instance and the ingest data. Both of these tasks may consume computing resources. AI model manager 104 may have access to a finite number of computing resources (e.g., processors, memory modules, storage devices, etc.), and/or may determine at any point in time which computing resources should be allocated to training an instance of the AI model, using the AI model to generate inferences, and/or any other task related to AI models.

Inference consumers 102 may provide, all or a portion, of the computer-implemented services. When doing so, inference consumers 102 may consume inferences obtained by AI model manager 104 (and/or other entities using AI models managed by AI model manager 104). However, if inferences from AI models are unavailable, then inference consumers 102 may be unable to provide, at least in part, the computer-implemented services, may provide less desirable computer-implemented services, and/or may otherwise be impacted in an undesirable manner. For example, if AI model manager 104 is providing inferences relied upon by inference consumers 102, then inference consumers 102 may be deprived of the inferences when the limited computing resources of AI model manager 104 are allocated to training an AI model instance rather than obtaining inferences.

Over time, new versions of the AI model may be obtained. The new versions of the AI models may be obtained, for example, due to requests from inference consumers 102, acquisition of additional training data that may improve the accuracy of inferences provided by the AI models, and/or for other reasons.

To obtain the AI models, existing AI models may be used as a basis for new AI models thereby leveraging the existing resource expenditures used to obtain the existing AI models. For example, updated instances of the AI models may be obtained through training as more training data is obtained (e.g., incremental learning).

Training of AI models may be computationally costly because training may require significant resource expenditures. However, the introduction of malicious or poisoned training data can in turn, poison the new AI model instance, any inferences obtained from the poisoned AI model instance, and further poison other AI model instances derived from the new AI model instance. A malicious attacker may generate poisoned data values to bias the AI model in a particular direction, to disrupt previously established relationships between features and labels in historical training data, to create new relationships between features and labels of the training data, etc.

Causal relationships (e.g., relationships between features and corresponding labels, relationships between features and other features) may be expected to be similar between historical training data and candidate training data that has not yet been used to train an instance of an AI model. Changes to forms of the causal relationships (e.g., changes to the functions) between the candidate training data set and the historical training data set may indicate an increased likelihood of the presence of poisoned training data values.

In addition, an attacker may not introduce poisoned training data that changes the form of the causal relationship previously represented by the historical training data set. Instead, the attacker may introduce poisoned training data that follows the previously defined form of the relationship with introduction or removal of some amount of random noise. By doing so, the strength of the relationship may be manipulated over time thereby decreasing (or increasing) the likelihood that an instance of the AI model trained using the poisoned training data may make predictions in accordance with the previously defined relationship.

In general, embodiments disclosed herein may provide methods, systems, and/or devices for managing AI models. The AI models may be managed in a manner that allows for the impact of poisoned training data to be identified and remediated in a computationally efficient manner. By doing so, the system may be more likely to be able to provide desired computer-implemented services due to improved access to computing resources.

To manage a trained instance of an AI model, the system of FIG. 1 may include AI model manager 104. AI model manager 104 may (i) obtain an AI model, (ii) obtain a training dataset or an ingest dataset, (iii) obtain a trained AI model instance, (iv) obtain an inference from the trained AI model instance, (v) provide access to the inference to other entities, (vi) update the AI model over time when update conditions indicate that the AI model should be updated, and/or (vii) generate snapshots for the AI model as it is updated over time.

In order to obtain a trained AI model instance, AI model manager 104 may obtain an AI model and a training dataset. The training dataset may be obtained through multiple data sources 100. Data sources 100 may include any number of data sources (e.g., 100A, 100N). For example, an AI model may be used for predicting weather. In this example, the AI model may be a deep learning model type and data sources may include multiple sensors collecting data representative of the ambient environment in which the multiple sensors are positioned (e.g., temperature sensors, humidity sensors, etc.). A training dataset may be created by collecting weather measurements from the sensors (e.g., temperature measurements over time, humidity measurements over time, etc.). The training dataset may then be used to train an instance of the AI model.

Further, in order to obtain an inference from the trained AI model instance, other data may be collected from the same data sources 100 or another data source. Continuing with the above example, another data source 100 may be a device managed by a user that generates timestamps. The ingest dataset may include future timestamps for which weather predictions are desired. An inference (e.g., a temperature prediction) may be obtained from the trained instance of the AI model after ingesting the ingest dataset, and the inference may be distributed to inference consumers 102.

Update conditions may indicate that the AI model should be updated when a candidate training data set is determined to not include poisoned training data. To determine whether to update the AI model, AI model manager 104 may: (i) obtain a candidate training data set usable to update an instance of the AI model, (ii) identify a historical training data set, the historical training data set being obtained prior to the candidate training data set and the historical training data set already having been used to train the instance of the AI model, (iii) obtaining a quantification of a difference between levels of strengths of similar causal relationships in the candidate training data set and the historical training data set, and/or (iv) determining whether the quantification is within a threshold for the quantification.

If the quantification is within the threshold for the quantification, a second instance of the AI model may be obtained using at least a portion of the candidate training data set. If the quantification is not within the threshold for the quantification, the candidate training data set may be treated as including poisoned training data.

To obtain the quantification, a first level of strength of a first causal relationship of the similar causal relationships from the historical training data set may be compared to a second level of strength of a second causal relationship of the similar causal relationships from the candidate training data set.

The first causal relationship may be based on a first feature present in the historical training data set and a first label (e.g., corresponding to the first feature) present in the historical training data set. For example, the first feature may include temperature measurements and the first label may include timestamps corresponding to the temperature measurements. The first causal relationship may, therefore, indicate how temperature and time are related in the historical training data set. When represented graphically, the first causal relationship may include, for example, a linear relationship with a particular slope.

To obtain the first level of strength of the first causal relationship, a goodness of fit of a function to a portion of the historical training data set that includes the first feature and the first label may be identified. The function may define the first causal relationship. The goodness of fit may indicate an extent to which the portion of the historical training data set follows the function and may be represented, for example, as a first coefficient of determination (e.g., a first $R^2$ value).

The second causal relationship may be based on a second feature present in the candidate training data set and a second label (e.g., corresponding to the second feature) present in the candidate training data set. For example, the second feature may include temperature measurements and the second label may include timestamps corresponding to the temperature measurements. The second causal relationship may, therefore, indicate how temperature and time are related in the candidate training data set over a period of time that follows a period of time associated with the first causal relationship. When represented graphically, the second causal relationship may include, for example, a linear relationship with a particular slope. The second causal relationship may be similar to the first causal relationship (e.g., both may be linear with similar slopes).

To obtain the second level of strength of the second causal relationship, a goodness of fit of the function to a portion of the candidate training data set that includes the second feature and the second label may be identified. The function may define the second causal relationship and may be similar to the first causal relationship. The goodness of fit may indicate an extent to which the portion of the candidate training data set follows the function and may be represented, for example, as a second coefficient of determination (e.g., a second $R^2$ value).

While described above with respect to relationships between features and corresponding labels, the relationships used to establish the first causal relationship and the second causal relationship may include other relationships without departing from embodiments disclosed herein. For example, the first causal relationship and the second causal relationship may relate two features (e.g., temperature and humidity) and may not be based on the corresponding labels for the two features.

Any number of causal relationships (e.g., between features and labels, between features and other features) may be represented using a causal graph that depicts any number of nodes and edges between the nodes. Each node of the nodes may be associated with a feature and/or a label and each edge may represent a relationship (e.g., a function) between each node shown in the causal graph.

In addition, the first level of strength of the first causal relationship and the second level of strength of the second relationship may be evaluated using other methods to evaluate other metrics, such as by performing a counterfactual analysis of causal relationships indicated by the causal graph. For example, the counterfactual analysis may investigate potential impacts of modifying values of the first causal relationship or of the second causal relationship on the structure of the causal graph, relationships depicted in the causal graph, predictions made by the AI model, and/or other impacts.

The first level of strength may be higher than the second level of strength, for example, if modifications to values of the first causal relationship have more significant impacts on the causal graph than similar modifications to values of the second causal relationship. Levels of strength of causal relationships may be obtained via other methods using other parameters without departing from embodiments disclosed herein.

The threshold for the quantification may be established based on a level of tolerance for use of poisoned training data in the AI model. For example, the threshold may be lower (e.g., allowing a narrower range of the difference to be considered acceptable) if a downstream consumer (e.g., an inference consumer) has a lower level of risk tolerance for potential manipulation of the AI model by poisoned training data. Similarly, the threshold may be higher (e.g., allowing a wider range of the difference to be considered acceptable) if the downstream consumer has a higher level of risk tolerance for the potential manipulation of the AI model by poisoned training data.

The snapshots generated throughout the life of the AI model may include full snapshots and/or incremental snapshots. A full snapshot of an AI model at a given time may include any or all information required to rebuild the AI model for the given time (e.g., the entire AI model structure, all neuron weights, all connections, etc.). However, an incremental snapshot of an AI model at a given time may only include a subset of the information stored in the full snapshot (e.g., only the neuron weights that have changed since the last full snapshot). Using incremental snapshots may improve efficiency as they may use fewer computing resources (e.g., data transfer and/or data storage) than a full snapshot. Generating snapshots of the AI model over time may allow for the impact of poisoned training data to be computationally efficiently mitigated if the AI model is updated using poisoned training data.

By doing so, embodiments disclosed herein may reduce inference supply interruptions to inference consumers 102 by reducing computing resources used for retraining poisoned AI models.

Inference consumers 102 may include any number of inference consumers (e.g., 102A, 102N). Inference consumers 102 may include businesses, individuals, or computers that may use the inference data to improve and/or automate decision-making.

While the example supplied is with respect to weather prediction, it will be appreciated that an AI model may be used to achieve other types of goals without departing from embodiments disclosed herein.

When performing its functionality, one or more of AI model manager 104, data sources 100, and inference consumers 102 may perform all, or a portion, of the methods and/or actions shown in FIGS. 2A-4.

Any of AI model manager 104, data sources 100, and inference consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of AI model manager 104 and any of the data sources 100 and inference consumers 102).

While illustrated in FIG. 1 as included a limited number of specific components, a system in accordance with an embodiment may include fewer, additional, and/or different components than those illustrated therein.

The system described in FIG. 1 may be used to reduce the computational cost for mitigating the impact of poisoned training data used train AI models. The following operations described in FIGS. 2A-2B may be performed by the system in FIG. 1 when providing this functionality.

Figure 2A:
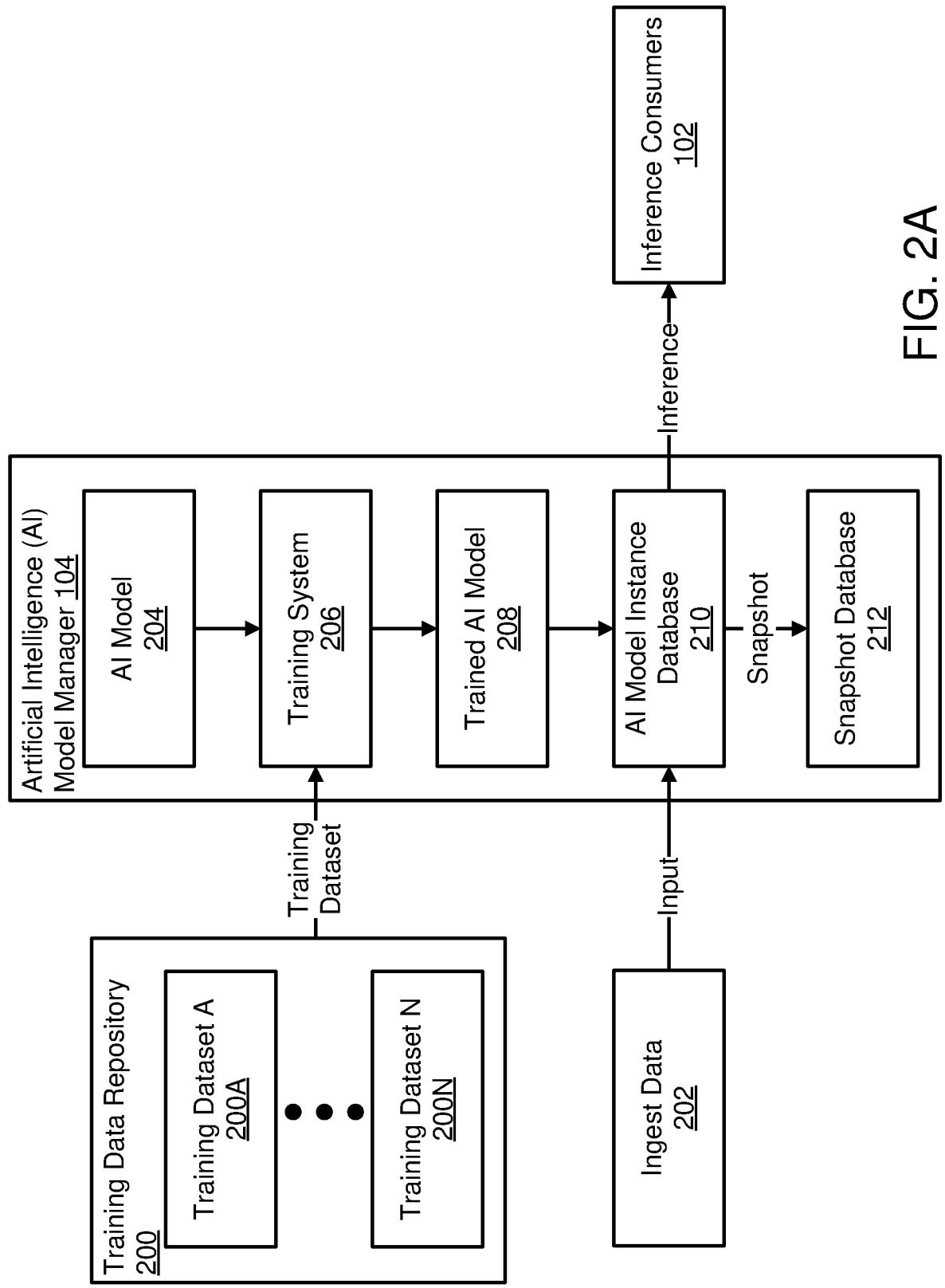
FIG. 2A shows a data flow diagram illustrating an AI model management system in accordance with an embodiment.

FIG. 2A shows a data flow diagram in accordance with an embodiment. The data flow diagram may illustrate the generation and use of AI models in a system similar to that of FIG. 1. As noted with respect to FIG. 1, the AI models may be used to obtain inferences, which may be used to provide computer-implemented services. For example, inference consumers 102 may consume weather prediction services for future timestamps. Weather prediction services may be provided by using AI models that have been trained to predict weather at certain times, in certain geographical locations, under certain conditions, etc.

As discussed with respect to FIG. 1, training data used for training AI models may be obtained from any number of data sources 100. Training data may be stored in training data repository 200. Training data repository 200 may include any number of training datasets (e.g., 200A, 200N).

Training data repository 200 may include data that defines an association between two pieces of information (e.g., which may be referred to as "labeled data"). For example, in the context of weather prediction, training data repository 200 may include past weather data labeled with timestamps, coordinates, and/or other data. The relationship between the weather data and the timestamps and/or other data may be a portion of labeled data.

Data sources 100 may also provide ingest data 202. Ingest data 202 may be a portion of data for which an inference is desired to be obtained. Ingest data 202 may not be labeled data and, thus, an association for ingest data 202 may not be known. For example, returning to the weather prediction services example, ingest data 202 may include future timestamps and/or other data for which weather predictions are desired. Ingest data 202 may be used by AI model manager 104 to obtain predicted weather conditions (e.g., through ingestion by an AI model).

AI model manager 104 may provide inferences for ingest data, such as ingest data 202. To do so, AI model manager 104 may include AI model 204 and training system 206. AI model 204 may be trained by training system 206 using a training dataset (e.g., training dataset 200A). For example, training system 206 may employ supervised learning using a training dataset that includes sample input data along with its desired output data (e.g., the pair being labeled data).

Once trained, trained AI model 208 may attempt to map the sample input data to the desired output data, as well as make inferences based on ingest data 202 that may differ from the sample data used to train trained AI model 208. In the context of the weather prediction services example, trained AI model 208 may be a trained weather prediction AI model, trained to map the time and/or location data to particular weather data.

To provide weather prediction services, AI model manager 104 may train any number of AI models which may generate inferences usable to predict weather for a particular geographical location, etc. To manage the trained AI models, the trained AI models (e.g., including trained AI model 208 and/or other trained AI models) may be stored in AI model instance database 210. AI model instance database 210 may include any number of trained AI model instances (e.g., trained AI model 208, other trained AI models that are not shown in FIG. 2A).

To generate inferences using the trained AI models, AI model instance database 210 (and/or other entities not shown) may receive ingest data 202. Ingest data 202 may be used to select one or more trained AI models to use to predict weather for timestamps included in ingest data 202.

Once selected, ingest data 202 may be input to a trained AI model instance to generate an inference. AI model manager 104 may obtain the inference, which may be provided to inference consumers 102. In the weather prediction example, a future timestamp at a particular geographical location may be input to the trained weather prediction AI model, the predicted weather data may be obtained by AI model manager 104, and the predicted weather may be provided to an inference consumer.

Over time, the AI models of AI model instance database 210 may need to be updated for a variety of reasons. For example, the trained AI models may become inaccurate, may not provide desired types of inferences, etc. Consequently, the trained AI models of AI model instance database 210 may be replaced and/or updated.

To reduce the likelihood of replacement or updating of trained AI models resulting in undesired outcomes (e.g., due to poisoning), snapshots for the trained AI models may be obtained. AI model manager 104 may obtain a snapshot of a trained AI model instance from AI model instance database 210. The snapshot may be stored by snapshot database 212. The snapshot may be stored by snapshot database 212 by: sending the snapshot to snapshot database 212 and storing the snapshot in a non-transitory storage medium.

Snapshot database 212 may include any number of snapshots of AI model instances. The snapshots of the AI model instances may include information regarding the structure of an AI model instance, information regarding inferences obtained from the AI model instance, and/or information regarding the training datasets used to train the AI model instance.

Thus, as illustrated in FIG. 2A, the system of FIG. 1 may provide inferences using trained AI models. However, as noted above, if the trained AI models are poisoned then the trained AI models may no longer be trustworthy for inference generation. To manage inference generation when poisoned trained AI models are identified, the snapshots of snapshot database 212 may be used to computationally efficiently restore inference generation functionality, manage tainted inferences, and/or otherwise mitigate the impact of poisoned training data.

Figure 2B:
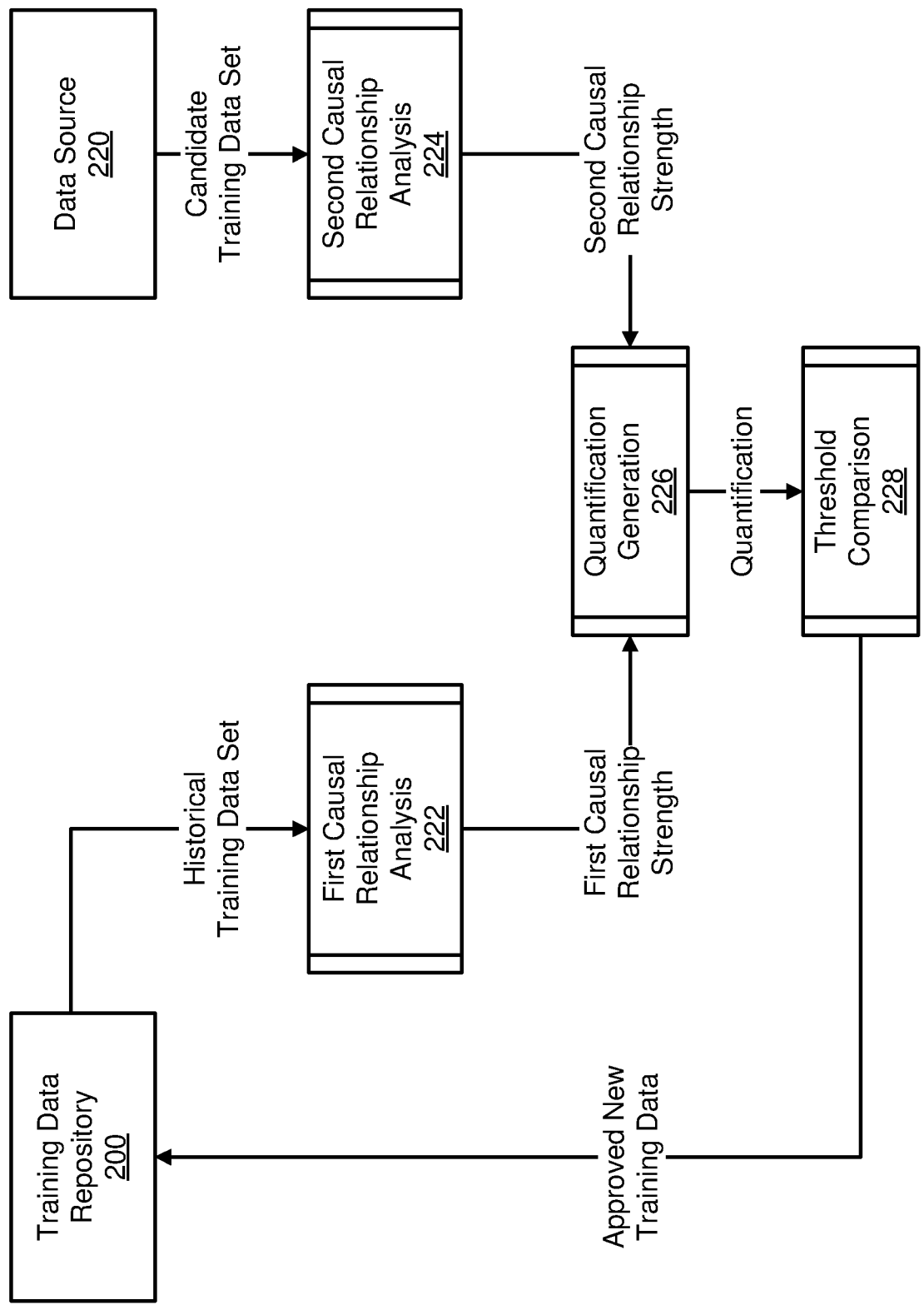
FIG. 2B shows a data flow diagram illustrating an AI model management system performing an analysis of candidate training data in accordance with an embodiment.

Turning to FIG. 2B, if re-training of the AI model is triggered (e.g., due to a time duration passing, inferences with low accuracy being obtained, and/or other conditions being met), a candidate training data set may be obtained from data source 220. Data source 220 may include any number of data sources and may be similar to any of data sources 100 described in FIG. 1. The candidate data set may include any quantity or type of data usable to re-train an AI model and/or as ingest for a trained AI model to generate inferences.

To determine a likelihood that the candidate training data set includes poisoned training data prior to using the candidate training data set to update an instance of the AI model, the candidate training data set may be compared to a historical training data set.

The historical training data set may be obtained from training data repository 200. The historical training data set may include any quantity and type of training data that was obtained (e.g., from data source 220 and/or from other sources) prior to obtaining the candidate training data set. In addition, this historical training data set may include training data (e.g., labeled data) that has been previously used to train an instance of the AI model and/or is otherwise considered trustworthy.

The historical training data set may include a first feature and a first label (e.g., may include labeled training data). The first feature may be based on first measurements of a quantity during a first period of time. The first label may be based on third measurements of a second quantity during the first period of time.

The candidate training data set may include a second feature and a second label (e.g., may include labeled training data). The second feature may be based on second measurements of the quantity during a second period of time. The second label may be based on fourth measurements of the second quantity during the second period of time. The first period of time may be prior to the second period of time.

For example, the first feature and the second feature may include any number of temperature measurements and the first label and the second label may include time measurements, each time measurement of the time measurements being associated with a temperature measurement of the temperature measurements. The temperature measurements may originate from a single temperature sensor or multiple temperature sensors positioned to collect temperature measurements at particular times representative of an ambient environment.

The temperature measurements included in the historical training data set may be from a period of time prior to the temperature measurements included in the candidate training data set. Therefore, the temperature measurements included in the candidate training data set may not have been previously used to train any instance of the AI model. For example, the historical training data set may include temperature measurements obtained in June of 2022 and the candidate training data set may include temperature measurements obtained in June of 2023 from the same geographical location.

The historical training data set may be used to perform first causal relationship analysis 222 process to obtain a first causal relationship strength and the candidate training data set may be used to perform second causal relationship analysis 224 process to obtain a second causal relationship strength.

First causal relationship analysis 222 process may include identifying and/or quantifying how changes to the first feature influence changes to the first label in the historical training data set. The first causal relationship may include any graphical representations, quantifications, and/or other information related to this impact. First causal relationship generation 222 process may include identifying and/or quantifying a causal relationship between the first feature and a third feature (e.g., humidity) instead of between the first feature and the first label.

For example, the first causal relationship may include a graphical representation of how the first feature and the first label are related (e.g., the first feature may be treated as a set of values on the x-axis of the graph and the first label may be treated as a set of corresponding values on the y-axis of the graph). A function may be chosen to best represent the relationship between the first feature and the first label (e.g., a line of best fit). The chosen function may include, for example, a linear relationship, an exponential relationship, a quadratic relationship, etc. A quantification of this relationship may include: (i) the equation for the function, (ii) defined variables associated with the function (e.g., intercepts, slopes, etc.), and/or (iii) other information.

The graphical representation of the first causal relationship may also be depicted on a causal graph made up of nodes and edges between the nodes. Each node of the nodes may be associated with a feature or a label corresponding to a feature, and each edge of the edges may represent a relationship (e.g., a function) between two of the nodes.

Therefore, the first feature may correspond to a first node, the first label (and/or a third feature) may correspond to a second node, and a first edge may connect the first node and the second node. The first edge may include, for example, an equation describing a relationship between the first node and the second node.

The first causal relationship strength may be based on a goodness of fit of the function (e.g., the chosen function) to a portion of the historical training data set. The first causal relationship strength may also be based, for example, on an extent to which making changes to the first causal relationship impact other relationships and/or structural elements of the causal graph. The portion of the historical training data set may include the first feature and the corresponding first label. As previously mentioned, the function may define the first causal relationship.

Continuing with the above example, the first causal relationship may indicate that a linear function fits the portion of the historical training data set. An equation for the linear relationship may be obtained and one or more quantities may also be obtained based on a statistical analysis of the equation and the portion of the historical training data set. Specifically, a first coefficient of determination (a first $R^2$ value) may be obtained to indicate an extent to which the portion of the historical training data set may be described by the function.

Figure 4:
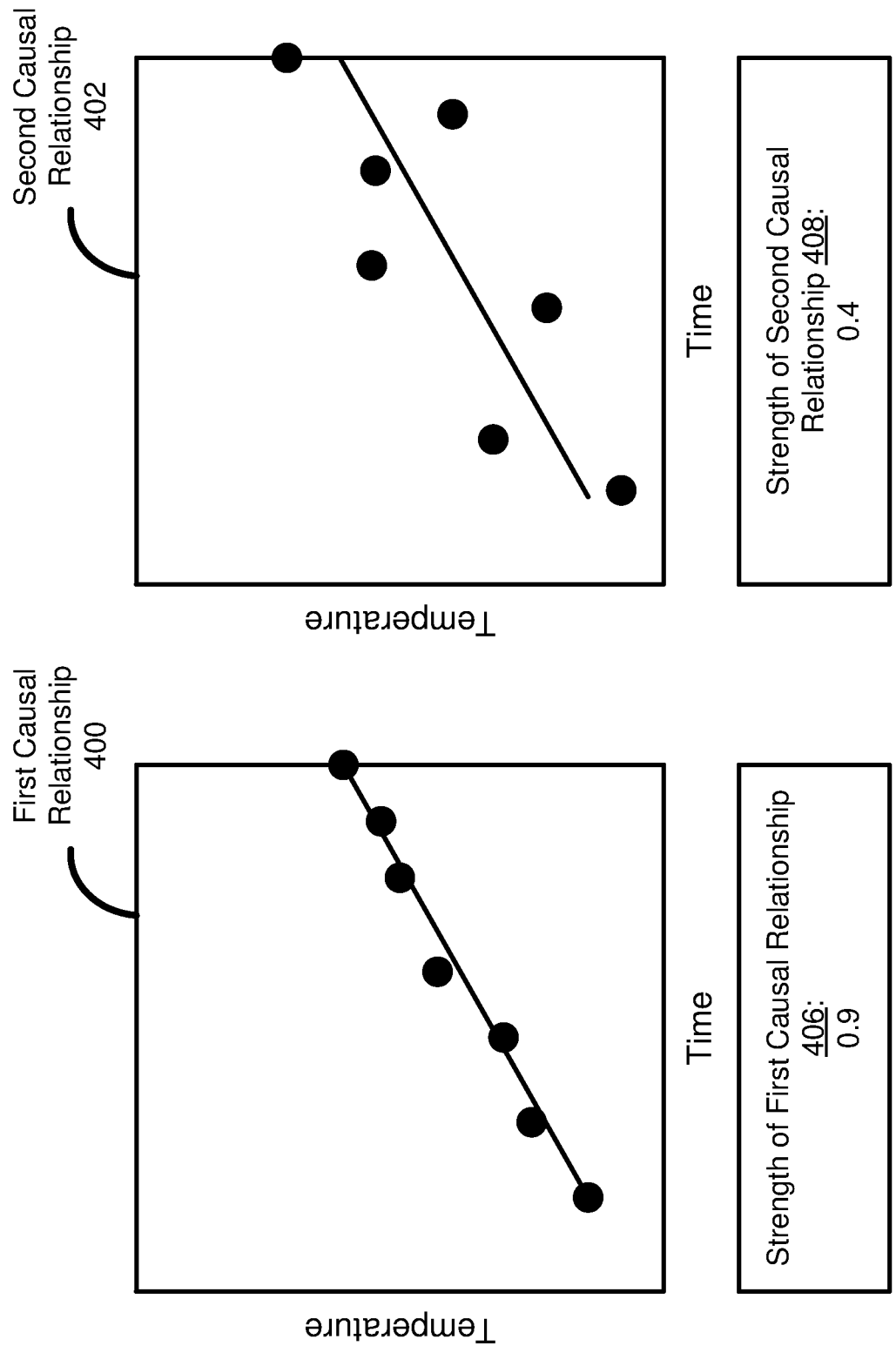
FIG. 4 shows a graphical representation of a causal analysis process performed using candidate training data and historical training data in accordance with an embodiment.

An $R^2$ value closer to 1 may indicate a better fit of the function to the portion of the historical training data set and an $R^2$ value closer to 0 may indicate a worse fit of the function to the portion of the historical training data set. Refer to FIG. 4 for a graphical representation of goodness of fits in causal relationships.

Similarly, second causal relationship analysis 224 process may include identifying and/or quantifying how changes to the second feature influence changes to the second label in the candidate training data set. The second causal relationship may include any graphical representations, quantifications, and/or other information related to this impact. Second causal relationship generation 224 process may include identifying and/or quantifying a causal relationship between the second feature and a fourth feature (e.g., humidity) instead of between the second feature and the second label.

For example, the second causal relationship may include a graphical representation of how the second feature and the second label are related (e.g., the second feature may be treated as a set of values on the x-axis of the graph and the second label may be treated as a set of corresponding values on the y-axis of the graph). A second function may be chosen to best represent the relationship between the second feature and the second label (e.g., a line of best fit). The chosen function may include, for example, a linear relationship, an exponential relationship, a quadratic relationship, etc. A quantification of this relationship may include: (i) the equation for the function, (ii) defined variables associated with the function (e.g., intercepts, slopes, etc.), and/or (iii) other information.

The second causal relationship strength may be based on a goodness of fit of the function (e.g., the chosen function) to a portion of the candidate training data set. The portion of the candidate training data set may include the second feature and the corresponding second label. As previously mentioned, the function may define the second causal relationship.

Continuing with the above example, the second causal relationship may indicate that a linear function fits the portion of the candidate training data set. An equation for the linear relationship may be obtained and one or more quantities may also be obtained based on a statistical analysis of the equation and the portion of the candidate training data set. Specifically, a second coefficient of determination (a second $R^2$ value) may be obtained to indicate an extent to which the portion of the candidate training data set may be described by the function.

The first causal relationship and the second causal relationship may relate same features (e.g., temperature measurements) and same labels (e.g., time measurements) and/or may relate same features (e.g., the temperature measurements) to same other features (e.g., humidity measurements). Although the measurements associated with the first causal relationship and the second causal relationship are obtained over different periods of time, the second causal relationship may be assumed to follow a similar pattern to the first causal relationship (e.g., a similar function with a similar level of strength). Continuing with the above example, temperature measurements may be expected to follow a consistent pattern over periods of time (e.g., from midnight to noon in a particular geographical location at a particular time of year).

If, for example, the second causal relationship shows an increase in variability of temperature measurements so that the linear relationship does not describe the temperature measurements as well as the temperature measurements of the first causal relationship between the hours of midnight and noon in June in a particular geographical location, the candidate training data set may be considered suspicious and, therefore, more likely to include poisoned training data.

To compare the first causal relationship strength to the second causal relationship strength, quantification generation 226 process may be performed to obtain a quantification. Quantification generation 226 process may include, for example, obtaining the first level of strength of the first causal relationship and the second level of strength of the second causal relationships and determining a difference between the first level of strength and the second level of strength.

For example, the first causal relationship may include a linear relationship between temperature and time with a first coefficient of determination of 0.9. The first coefficient of determination may indicate a first goodness of fit of the function (e.g., the linear relationship) to a portion of the historical training data that includes the first feature and the first label. The first coefficient of determination may be treated as a first level of strength of the first causal relationship (e.g., the first causal relationship strength).

The second causal relationship may include a similar linear relationship between temperature and time with a second coefficient of determination of 0.4. The second coefficient of determination may indicate a second goodness of fit of the function (e.g., the linear relationship) to a portion of the candidate training data set that includes the second feature and the second label. The second coefficient of determination may indicate that the linear relationship does not describe the portion of the candidate training data set as well as the portion of the historical training data set. The second coefficient of determination may be treated as a second level of strength of the second causal relationship (e.g., the second causal relationship strength).

Using this example, quantification generation 226 process may include performing a subtraction operation using the first coefficient of determination and the second coefficient of determination to obtain a difference of 0.5. Other quantities representative of the goodness of fit of the function may also be used when calculating the difference without departing from embodiments disclosed herein.

In addition, while described here as comparing two linear relationships, quantification generation 226 process may include comparison between any types of relationships and any types of quantities related to those relationships without departing from embodiments disclosed herein. Refer to FIG. 4 for a graphical representation of causal relationships.

The quantification may indicate a degree to which the second causal relationship strength is different from the first causal relationship strength. As it may be assumed that the first causal relationship strength and the second causal relationship strength are expected to be similar, the degree of difference may assist in determining a likelihood that the candidate training data set includes poisoned training data.

To determine whether the difference indicated by the quantification is acceptable (e.g., to a downstream consumer of inferences generated using the AI model that is potentially poisoned), the quantification may be compared to a threshold for the quantification via threshold comparison 228 process.

The threshold for the quantification may be based on a level of tolerance for use of poisoned training data in the AI model. The level of tolerance may include, for example, a quantification of a risk tolerance indicated by an inference consumer (e.g., inference consumers 102). The level of tolerance may be based on downstream use of the inferences by inference consumers 102 and an extent to which the inferences generated by the potentially poisoned instance of the AI model may impact services and/or decisions made by inference consumers 102. Therefore, a lower threshold may be associated with a lower tolerance and a higher threshold may be associated with a higher tolerance.

In FIG. 2B, the quantification may fall within the threshold for the quantification and, therefore, the candidate training data set may be treated as approved new training data. The approved new training data may be transferred to training data repository 200 and may be used to train subsequent instances of the AI model. If the quantification does not fall within the threshold for the quantification, the candidate training data set may be treated as potentially poisoned.

In an embodiment, the one or more entities performing the operations shown in FIGS. 2A-2B are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

Figure 3A:
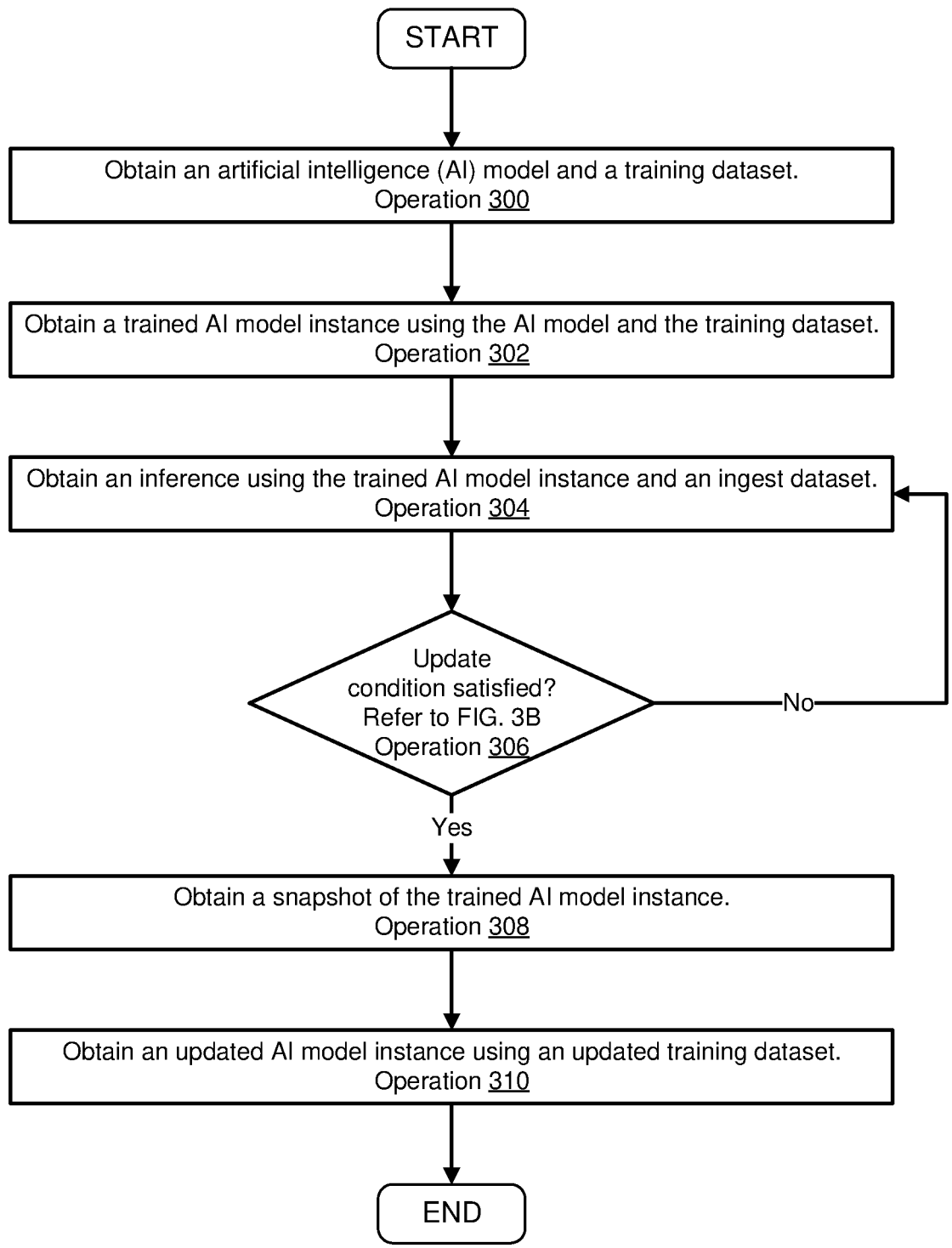
FIG. 3A shows a flow diagram illustrating a method of updating an AI model instance in accordance with an embodiment.
Figure 3B:
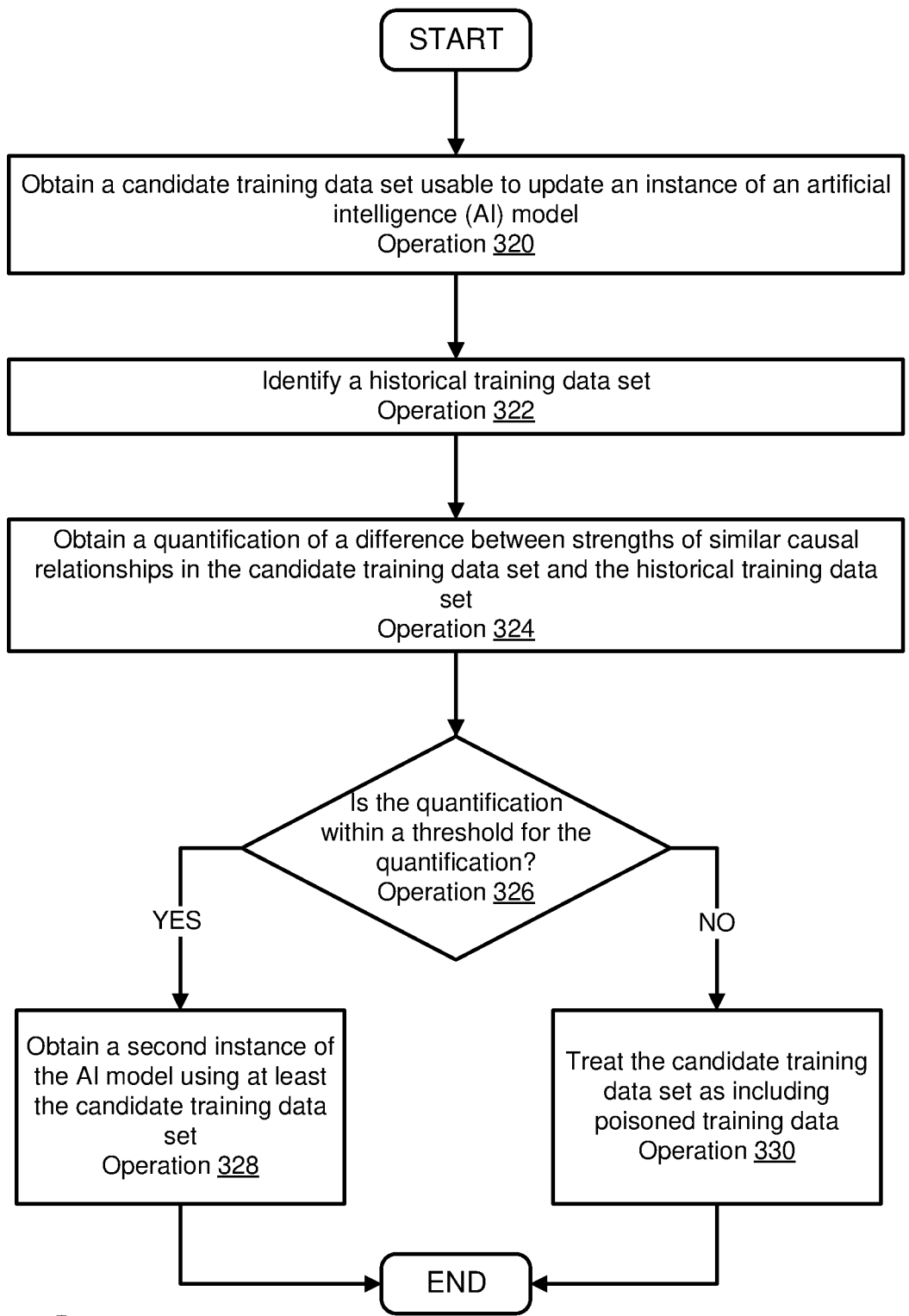
FIG. 3B shows a flow diagram illustrating a method of determining whether treat a candidate training data set as including poisoned training data in accordance with an embodiment.

As discussed above, the components of FIG. 1 may perform various methods to manage AI models. FIGS. 3A-3B illustrate methods that may be performed by the components of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of updating an AI model instance in accordance with an embodiment is shown. The method may be performed by a data processing system, and/or another device.

At operation 300, an AI model and a training dataset may be obtained. The AI model may be obtained by (i) reading the AI model from storage, (ii) receiving the AI model from another device, and/or (iii) generating the AI model, for example by programming a data processing system and/or another device. The AI model may be a particular type of AI model, such as a linear regression model, a deep neural network, a decision tree, etc.

The type of AI model obtained may depend on the goals of inference consumers and/or other factors such as (i) training dataset characteristics (e.g., data type, size and/or complexity), (ii) cost limitations (e.g., the cost to train and/or maintain the AI model), (iii) time limitations (e.g., the time to train the AI model and/or for inference generation), and/or (iv) inference characteristics (e.g., accuracy and/or inference type). For example, a complex AI model such as a multi-layered neural network may process a large amount of complex data and generate highly accurate inferences, but may be costly to train and maintain and may have low explainability (e.g., may act as a "black box"). In contrast, a linear regression model may be a simpler, less costly AI model with high explainability, but may only be well-suited for data whose labels are linearly correlated with the selected features, and may generate less accurate inferences than a neural network.

The training dataset may be obtained by (i) reading the training dataset from storage, (ii) receiving the training dataset from another device, and/or (iii) generating the training dataset, for example, by gathering and measuring information from one or more data sources. The training dataset may include labeled data or unlabeled data. Training data included in the training dataset may be processed, cleansed and/or evaluated for quality in order to prepare the training dataset for use in training AI models.

At operation 302, a trained AI model instance may be obtained using the AI model and the training dataset. The trained AI model may be obtained by training the AI model to relate pieces of data (e.g., an input and an output) from the training dataset using a training system, such as the one in FIGS. 2A-2B. To do so, the training dataset and the AI model may be input to the training system.

The training system may employ machine learning techniques such as supervised learning, unsupervised learning, semi-supervised learning, etc. As part of the training process, the AI model may undergo a validation and/or testing step to improve and/or measure the reliability of generated inferences.

At operation 304, an inference is obtained using the trained AI model instance and an ingest dataset. The inference may be obtained by feeding ingest data collected from one or more data sources to the trained AI model instance. The trained AI model instance may produce the inference as output in response to the ingest data.

The inference may be received by an AI model management system which may then provide the inference to inference consumers. An inference consumer may use the provided inference to help with decision-making and/or problem-solving. Any number of inferences may be obtained from the trained AI model instance and provided to inference consumers until the trained AI model instance is replaced with an updated AI model instance.

At operation 306, a determination is made regarding whether an update condition is satisfied. The determination may be made by comparing characteristics of the trained AI model, characteristics of available training data, and/or other characteristics to corresponding conditions that, if met, indicate that the update condition is satisfied.

For example, the update condition may be satisfied if (i) a sufficient amount of approved new training data has been gathered for updating purposes (e.g., based on comparison to a training data threshold), (ii) the AI model inference accuracy is unsatisfactory (e.g., based on a comparison to an inference accuracy threshold), (iii) an AI model is updated according to a schedule that fits business needs (e.g., based on a comparison between when the trained AI model was last updated and the current point in time), and/or (iv) other basis of comparison between the current characteristics of the AI model, training data, etc. Refer to FIG. 3B for additional details regarding whether to update an instance of the AI model.

If at operation 306 the update condition is not satisfied, then the method may return to operation 304 (e.g., thereby allowing for another inference to be obtained using the currently trained AI model instance and available ingest data). However, if the update condition is satisfied, then the method may proceed to operation 308.

At operation 308, a snapshot of the trained AI model instance is obtained. The snapshot of the trained AI model instance may be obtained by (i) reading the snapshot from storage, (ii) obtaining the snapshot from another device, and/or (iii) by generating the snapshot.

The snapshot may be generated by storing, in a non-transitory storage medium, (i) a copy of the structure of the instance of the AI model, (ii) metadata for the inferences obtained from the instance of the AI model, the metadata indicating an inference consumer that has consumed the inference, (iii) a copy of the portion (and/or metadata for accessing an archived portion) of the training dataset used to train the instance of the AI model, and/or (iv) metadata identifying data sources from which training data has been collected.

The structure of the instance of the AI model may be stored by (i) storing a copy of the architecture of the AI model and parameters (e.g., weights for the hidden layers) that may change as the AI model is modified over time, or (ii) storing a reference to the architecture (if previously stored) and the parameters of the AI model. For example, when first stored, both the architecture of the AI model (e.g., which may include a description of the neurons, bias function descriptions, activation function descriptions, etc.) and the parameters may be stored. However, as the AI model is evolved, the structure may be stored as part of the snapshot by merely referencing the existing stored architecture and storing the changed parameters.

The parameters may include, for example, a first element from a hidden layer of the instance of the AI model (e.g., the process may be extended until all weights for the instance of the AI model are stored). Additionally, metadata regarding the structure of the instance of the AI model may also be stored to facilitate identification of the instance of the AI model and/or for other purposes.

An initial snapshot of an AI model may include information that may remain static throughout the life of the AI model (e.g., the structure of the AI model), whereas subsequent snapshots may only include dynamic information (e.g., weights).

The metadata for the inference may be stored by storing an identifier for an input used to obtain the inference, an identifier for the inference, identification information for the inference consumer, and/or a time stamp indicating when the inference was generated. Any number of snapshots of AI model instances may be stored in a snapshot database.

By storing the snapshot of an AI model instance, the snapshot may be used to (i) reduce the computational costs for reverting a poisoned AI model instance to a previous AI model instance that is unpoisoned (e.g., not trained using poisoned data), (ii) mitigate the effects of a poisoned inference provided to inference consumers, and/or (iii) purge poisoned training data from a training data repository to avoid poisoning any updated AI models that may be updated (e.g., trained) using the poisoned training data. However, if poisoned training data is not identified, AI models may be continuously updated (e.g., trained) as updated training data (e.g., new training data) is made available.

At operation 310, an updated AI model instance is obtained using an updated training dataset. The updated AI model instance may be obtained by further training (e.g., updating) the trained AI model instance to relate pieces of data from an updated training dataset using a training system. The updated training dataset may include newly acquired training data (e.g., training data that has not already been used to train the trained AI model instance).

The training system may employ machine-learning methods such as incremental learning, which may allow an additional training step as new training data becomes available, and may adjust what has already been learned by the AI model according to the new training data. Traditional machine learning methods may assume the availability of a sufficient training dataset before the first training process begins and may not allow for adjustments when only new training data is introduced. In either case, at the time poisoned training data is introduced into the training dataset, the subsequently trained and/or updated AI models may be affected by the poisoned training data, requiring reverting to an AI model that has not been trained using poisoned training data.

The method may end following operation 310.

Turning to FIG. 3B, a flow diagram illustrating a method of determining whether to treat a candidate training data set as including poisoned training data in accordance with an embodiment is shown. The operations in FIG. 3B may be an expansion of operation 306 in FIG. 3A. The method may be performed by AI model manager 104, data sources 100, inference consumers 102, and/or any other entity without departing from embodiments disclosed herein.

At operation 320, a candidate training data set is obtained. Obtaining the candidate training data set may include: (i) requesting the candidate training data set from a data source (e.g., any of data sources 100) and/or any other entity, (ii) receiving (via an automatic transmission and/or scheduled transmission) from a data source in accordance with a data transmission schedule or other plan for updating the AI model. The candidate training data set may be obtained in response to an identification that an update condition is met for the AI model. The identification may be made by evaluating characteristics of data sets obtained from data sources (e.g., data sources 100), characteristics of the inferences generated by the AI model, and or other data and determining that the data meets certain criteria. The identification may also be made by receiving a request for re-training.

At operation 322, a historical training data set may be identified. The historical training data set may be identified in response to obtaining the candidate training data set, at regular intervals, and/or upon request. The historical training data set may include all training data previously used to train an instance of the AI model. The historical training data set may be obtained by: (i) receiving the historical training data set from a data source, (ii) reading the historical training data set from storage (e.g., a training data repository), and/or (iii) via other methods.

At operation 324, a quantification is obtained of a difference between strengths of similar causal relationships in the candidate training data set and the historical training data set. Obtaining the quantification may include: (i) reading the quantification from storage, (ii) receiving the quantification from another entity (e.g., in the form of a transmission over a communication system, etc.), (iii) generating the quantification, and/or (iv) other methods.

Generating the quantification may include: (i) identifying a first causal relationship of the similar causal relationships in the historical training data set, (ii) identifying a first level of strength of the first causal relationship, (iii) identifying a second causal relationship of the similar causal relationships in the candidate training data set, (iv) identifying a second level of strength of the second causal relationship, (v) obtaining a difference between the first level of strength and the second level of strength, and/or (vi) treating the difference as the quantification.

Identifying the first causal relationship may include: (i) reading the first causal relationship from storage, (ii) receiving the first causal relationship from another entity (e.g., in the form of a transmitted message, etc.), (iii) generating the first causal relationship, and/or (iv) other methods.

Generating the first causal relationship may include: (i) obtaining a first feature present in the historical training data set, (ii) obtaining a first label present in the historical training data set, (iii) establishing a relationship between the first feature and the first label, and/or (iv) other methods.

Obtaining the first feature may include: (i) obtaining a list of features present in the historical training data set, (ii) selecting a feature from the list of the features, and/or (iii) treating the feature as the first feature.

Obtaining the first label may include: (i) obtaining a list of labels corresponding to features in the historical training data set, (ii) selecting a label that corresponds to the first feature, and/or (iii) treating the label as the first label.

Establishing a relationship between the first feature and the first label may include: (i) generating a graphical representation of the first feature and the first label, the graphical representation treating the first feature as a set of x-values and the first label as a set of y-values (or vice versa), (ii) identifying a mathematical function that most closely matches the distribution of x-values and y-values on the graphical representation, (iii) obtaining one or more quantities (e.g., a slope, an equation, intercepts, etc.) associated with the mathematical function, (iv) treating the one or more quantities as the relationship between the first feature and the first label, and/or (v) other methods.

Identifying the first level of strength of the first causal relationship may include: (i) reading the first level of strength from storage, (ii) obtaining the first level of strength from another entity (e.g., in the form of a message over a communication system), (iii) generating the first level of strength, and/or (iv) other methods.

Generating the first level of strength may include performing a statistical analysis using the first causal relationship, the first feature, the first label, and/or other data to obtain a first quantification of the goodness of fit. The first feature and the first label may be included in a portion of the historical training data set. The first quantification of the goodness of fit may indicate how well the function describes the portion of the historical training data set.

For example, generating the first level of strength may include calculating a first coefficient of determination for the first causal relationship.

Identifying the second causal relationship may include: (i) reading the second causal relationship from storage, (ii) receiving the second causal relationship from another entity (e.g., in the form of a transmitted message, etc.), (iii) generating the second causal relationship, and/or (iv) other methods.

Generating the second causal relationship may include: (i) obtaining a second feature present in the candidate training data set, (ii) obtaining a second label present in the candidate training data set, (iii) establishing a relationship between the second feature and the second label, and/or (iv) other methods.

Obtaining the second feature may include: (i) obtaining a list of features present in the candidate training data set, (ii) selecting a feature from the list of the features that matches the first feature obtained from the historical training data set, and/or (iii) treating the feature that matches the first feature as the second feature.

Obtaining the first label may include: (i) obtaining a list of labels corresponding to features in the candidate training data set, (ii) selecting a label that corresponds to the second feature and that matches the first label, and/or (iii) treating the label that corresponds to the second feature as the second label.

Establishing a relationship between the second feature and the second label may include: (i) generating a graphical representation of the second feature and the second label, the graphical representation treating the second feature as a set of x-values and the second label as a set of y-values (or vice versa), (ii) identifying a mathematical function that most closely matches the distribution of x-values and y-values on the graphical representation, (iii) obtaining one or more quantities (e.g., a slope, an equation, intercepts, etc.) associated with the mathematical function, (iv) treating the one or more quantities as the relationship between the second feature and the second label, and/or (v) other methods.

Identifying the second level of strength of the second causal relationship may include: (i) reading the second level of strength from storage, (ii) obtaining the second level of strength from another entity (e.g., in the form of a message over a communication system), (iii) generating the second level of strength, and/or (iv) other methods.

Generating the second level of strength may include performing a statistical analysis using the second causal relationship, the second feature, the second label, and/or other data to obtain a second quantification of the goodness of fit. The second feature and the second label may be included in a portion of the candidate training data set. The second quantification of the goodness of fit may indicate how well the function describes the portion of the candidate training data set.

For example, generating the second level of strength may include calculating a second coefficient of determination for the second causal relationship.

Obtaining the difference may include: (i) reading the difference from storage, (ii) receiving the difference (e.g., in the form of a message over a communication system) from another entity, (iii) generating the difference, and/or (iv) other methods.

Generating the difference may include performing a subtraction operation using the first level of strength and the second level of strength to obtain the difference.

At operation 326, it is determined whether the quantification exceeds a threshold for the quantification. Determining whether the quantification exceeds the threshold for the quantification may include: (i) obtaining the threshold for the quantification, (ii) comparing the quantification to the threshold for the quantification, and/or (iii) other methods. The quantification may also be transmitted to another entity responsible for comparing the quantification to the threshold for the quantification.

The threshold for the quantification may be obtained by: (i) reading the threshold for the quantification from storage, (ii) obtaining the threshold for the quantification from another entity, (iii) generating the threshold for the quantification, and/or (iv) other methods.

The quantification and, therefore, the threshold for the quantification may also be based on: (i) an extent to which a structure of a causal graph (e.g., a visual representation of any number of relationships between any number of features and/or labels) would change upon addition of at least a portion of the candidate training data set, (ii) for portions of the structure of the causal graph that remain the same, an extent of differences between causal relationship parameters upon addition of at least a portion of the candidate training data set, (iii) an extent to which predictions made by the AI model may change upon addition of at least a portion of the candidate training data set, and/or (iv) other metrics.

If the quantification exceeds the threshold for the quantification, the method may proceed to operation 328. If the quantification does not exceed the threshold for the quantification, the method may proceed to operation 330.

At operation 328, the candidate training data set is treated as not including poisoned training data. To treat the candidate training data set as not including poisoned training data, the instance of the AI model may be updated using the candidate training data set to obtain a new instance of the AI model. To do so, a re-training process may be performed on the AI model using the candidate training data set as training data. The new instance of the AI model may be the result of the re-training process and may be more likely to faithfully predict the outputs included in the candidate training data set when the input values included in the candidate training data set are used as ingest for the new instance of the AI model.

In addition, the candidate training data set may be added to the historical training data set. To do so, the data values associated with the candidate training data set may be copied to a listing of data values associated with the historical training data set. By doing so, the candidate training data set may be considered as previously used to train an instance of the AI model (and, therefore, considered as having an acceptably low likelihood of including poisoned training data). The updated historical training data set may be used to evaluate similarities between future candidate training data sets and the updated historical training data set.

The method may end following operation 326.

Returning to operation 326, the method may proceed to operation 330 if the quantification is not within the threshold for the quantification. At operation 330, the candidate training data set is treated as including poisoned training data. Treating the candidate training data set as including poisoned training data may include performing an action set. The action set may include one or more of: (i) removing the first training data set from consideration as training data for the AI model, (ii) treating the first training data set as being part of a malicious attack, (iii) discarding the first training data set, (iv) identifying a data source of the first training data set, and/or (iv) treating the data source of the first training data set as a potentially malicious data source.

To remove the candidate training data set from consideration as training data for the AI model, the candidate training data set may be re-labeled as poisoned training data. The poisoned training data may be stored separately and/or may be discarded as described below. In addition, a notification that the candidate training data set is to be removed from consideration as training data for the AI model may be transmitted to an entity responsible for updating (re-training) the AI model.

To treat the candidate training data as being part of a malicious attack, a notification of the malicious attack may be transmitted to a downstream consumer and/or other entity responsible for responding to and remediating malicious attacks. The notification of the malicious attack may trigger an action set to further investigate and/or remediate the malicious attack.

The candidate training data may be discarded by deleting all copies of the candidate training data, storing the candidate training data set in storage (locally or offsite) and/or via other methods.

To identify a data source of the candidate training data set, metadata associated with the candidate training data may be obtained. The metadata may include information such as the data source of the candidate training data and a time stamp for when the candidate training data set was obtained. The metadata may be obtained by accessing a metadata database. The metadata database may include each data value of each data set obtained from data sources and the metadata associated with each data value.

To treat the data source of the candidate training data set as a potentially malicious data source, the metadata associated with the candidate training data set may be modified to include a warning of potentially poisoned training data originating from the data source. Future training data transmitted from the data source may be subject to additional scrutiny to detect poisoned training data and/or may be automatically removed from consideration. In addition, the data source may be blocked from all future data transmissions.

The method may end following operation 330.

Turning to FIG. 4, graphical representations of causal relationships between features and labels in training data are shown. Consider a scenario in which a candidate training data set is being evaluated to determine the likelihood that the candidate training data set includes poisoned training data. To do so, a historical training data set (e.g., a data set including all data values previously used to train an instance of an AI model) may be obtained.

First causal relationship 400 may be obtained based on the historical training data set and second causal relationship 402 may be obtained based on the candidate training data set.

First causal relationship 400 may visually depict a first relationship between a first feature (e.g., temperature) and a first label (e.g., time). First causal relationship 400 may demonstrate a linear relationship between temperature and time for the period of time over which the historical training data set spans.

Second causal relationship 402 may visually depict a second relationship between a second feature (e.g., temperature) and a second label (e.g., time) at a period of time following a period of time over which the first feature and the first label were obtained. Second causal relationship 402 may demonstrate a linear relationship between temperature and time for the period of time over which the candidate training data set spans. The linear relationship demonstrated by second causal relationship 402 may be similar to the linear relationship demonstrated by first causal relationship 400 (e.g., may both be linear with similar slopes).

To determine a goodness of fit of the linear relationship to a portion of the historical training data included in first causal relationship 400, strength of first causal relationship 406 may be obtained. Strength of first causal relationship 406 may include a first coefficient of determination (e.g., a first $R^2$ value) of 0.9.

To determine a goodness of fit of the linear relationship to a portion of the candidate training data set included in second causal relationship 402, strength of second causal relationship 408 may be obtained. Strength of second causal relationship 408 may include a second coefficient of determination (e.g., a second $R^2$ value) of 0.4.

A difference of 0.5 may be obtained by subtracting strength of second causal relationship 408 from strength of first causal relationship 406. A threshold for the difference may be 0.3 and, therefore, the portion of the candidate training data set included in second causal relationship 402 may be treated as including potentially poisoned training data. Consequently, the candidate training data set may not be used to update an instance of an AI model.

Figure 5:
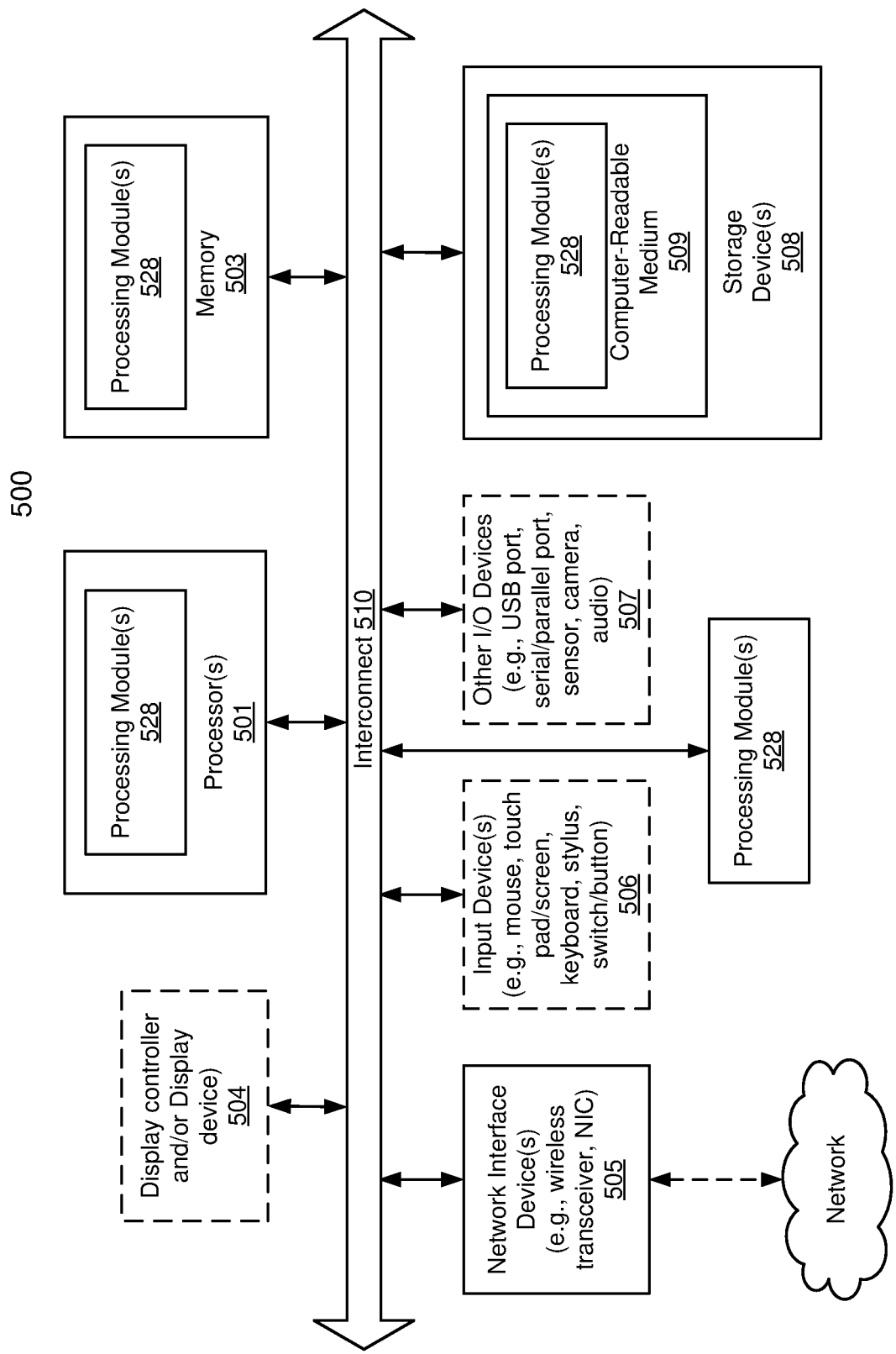
FIG. 5 shows a block diagram illustrating a data processing system in accordance with an embodiment.

Any of the components illustrated in FIGS. 1-2B may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high-level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random-access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs, or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing an artificial intelligence (AI) model, performed by one or more hardware processors, the method comprising:

obtaining, by the one or more hardware processors through a communication system, a candidate training data set usable to update an instance of the AI model;

identifying a historical training data set, the historical training data set being obtained prior to the candidate training data set and the historical training data set already having been considered as trustworthy;

obtaining a quantification of a difference between levels of strengths of similar causal relationships in the candidate training data set and the historical training data set, wherein a level of strength of the levels of strengths is based on a goodness of fit of a function to a portion of the historical training data set, the function defining a causal relationship of the similar causal relationships;

making a determination regarding whether the quantification is within a threshold for the quantification;

in a first instance of the determination in which the quantification is within the threshold: obtaining a second instance of the AI model using at least the candidate training data set; and in a second instance of the determination in which the quantification is not within the threshold: treating the candidate training data set as comprising poisoned training data.

2. The method of claim 1, wherein obtaining the quantification comprises:

identifying a first causal relationship of the similar causal relationships in the historical training data set;

identifying a first level of strength of the first causal relationship;

identifying a second causal relationship of the similar causal relationships in the candidate training data set; and identifying a second level of strength of the second causal relationship.

3. The method of claim 2, wherein the first causal relationship and the second causal relationship relate same features and same labels.

4. The method of claim 3, wherein the first causal relationship is based on a first feature present in the historical training data set and a first label present in the historical training data set.

5. The method of claim 4, wherein the second causal relationship is based on a second feature present in the historical training data set and a second label present in the historical training data set.

6. The method of claim 5, wherein the first feature is based on first measurements of a quantity during a first period of time and the second feature is based on second measurements of the quantity during a second period of time, the first period of time being prior to the second period of time.

7. The method of claim 6, wherein the first label is based on third measurements of a second quantity during the first period of time and the second label is based on fourth measurements of the second quantity during the second period of time.

8. The method of claim 1, wherein the quantification of the difference is based on the goodness of fit and a second goodness of a second fit of a second function to a second portion of the candidate training data set.

9. The method of claim 1, wherein the threshold is based on a level of tolerance for use of poisoned training data in the AI model.

10. A non-transitory machine-readable medium having instructions stored therein, which when executed by a hardware processor, cause the hardware processor to perform operations for managing an artificial intelligence (AI) model, the operations comprising:

obtaining, through a communication system, a candidate training data set usable to update an instance of the AI model;

identifying a historical training data set, the historical training data set being obtained prior to the candidate training data set and the historical training data set already having been considered as trustworthy;

obtaining a quantification of a difference between levels of strengths of similar causal relationships in the candidate training data set and the historical training data set, wherein a level of strength of the levels of strengths is based on a goodness of fit of a function to a portion of the historical training data set, the function defining a causal relationship of the similar causal relationships;

making a determination regarding whether the quantification is within a threshold for the quantification;

in a first instance of the determination in which the quantification is within the threshold: obtaining a second instance of the AI model using at least the candidate training data set; and in a second instance of the determination in which the quantification is not within the threshold: treating the candidate training data set as comprising poisoned training data.

11. The non-transitory machine-readable medium of claim 10, wherein obtaining the quantification comprises:

identifying a first causal relationship of the similar causal relationships in the historical training data set;

identifying a first level of strength of the first causal relationship;

identifying a second causal relationship of the similar causal relationships in the candidate training data set; and identifying a second level of strength of the second causal relationship.

12. The non-transitory machine-readable medium of claim 11, wherein the first causal relationship and the second causal relationship relate same features and same labels.

13. The non-transitory machine-readable medium of claim 12, wherein the first causal relationship is based on a first feature present in the historical training data set and a first label present in the historical training data set.

14. The non-transitory machine-readable medium of claim 13, wherein the second causal relationship is based on a second feature present in the historical training data set and a second label present in the historical training data set.

15. The non-transitory machine-readable medium of claim 14, wherein the first feature is based on first measurements of a quantity during a first period of time and the second feature is based on second measurements of the quantity during a second period of time, the first period of time being prior to the second period of time.

16. The non-transitory machine-readable medium of claim 15, wherein the first label is based on third measurements of a second quantity during the first period of time and the second label is based on fourth measurements of the second quantity during the second period of time.

17. A data processing system, comprising:

a hardware processor; and a memory coupled to the hardware processor to store instructions, which when executed by the hardware processor, cause the hardware processor to perform operations for managing an artificial intelligence (AI) model, the operations comprising:

obtaining, through a communication system, a candidate training data set usable to update an instance of the AI model;

identifying a historical training data set, the historical training data set being obtained prior to the candidate training data set and the historical training data set already having been considered as trustworthy;

obtaining a quantification of a difference between levels of strengths of similar causal relationships in the candidate training data set and the historical training data set, wherein a level of strength of the levels of strengths is based on a goodness of fit of a function to a portion of the historical training data set, the function defining a causal relationship of the similar causal relationships;

making a determination regarding whether the quantification is within a threshold for the quantification;

in a first instance of the determination in which the quantification is within the threshold: obtaining a second instance of the AI model using at least the candidate training data set; and in a second instance of the determination in which the quantification is not within the threshold: treating the candidate training data set as comprising poisoned training data.

18. The data processing system of claim 17, wherein obtaining the quantification comprises:

identifying a first causal relationship of the similar causal relationships in the historical training data set;

identifying a first level of strength of the first causal relationship;

identifying a second causal relationship of the similar causal relationships in the candidate training data set; and identifying a second level of strength of the second causal relationship.

19. The data processing system of claim 18, wherein the first causal relationship and the second causal relationship relate same features and same labels.

20. The data processing system of claim 19, wherein the first causal relationship is based on a first feature present in the historical training data set and a first label present in the historical training data set.

* * * * *